United States Patent [19]

Bedenbender et al.

[11] 4,026,383
[45] May 31, 1977

[54] GYROSCOPIC VIBRATOR

[75] Inventors: John W. Bedenbender, Plano;
Gilbert H. Kelly, Irving, both of Tex.

[73] Assignee: Texas Instruments Incorporated, Dallas, Tex.

[22] Filed: Nov. 4, 1974

[21] Appl. No.: 520,393

[52] U.S. Cl. .......................... 181/121; 340/17 R; 73/71.5 R
[51] Int. Cl.² ............................................ G01V 1/14
[58] Field of Search ............ 181/121; 340/17, 8 R; 73/517 AV, 67, 71.5, 71.6, 67.2; 74/5.22, 5 R

[56] References Cited

UNITED STATES PATENTS

| | | | |
|---|---|---|---|
| 2,468,137 | 4/1949 | Tear | 74/5.22 |
| 2,995,934 | 8/1961 | Adams et al. | 73/71.6 |
| 3,137,835 | 6/1964 | Bielecki | 181/121 |
| 3,244,252 | 4/1966 | Burns | 181/121 |
| 3,313,163 | 4/1967 | Flannelly | 74/5.22 |
| 3,320,818 | 5/1967 | Magnus | 74/5.22 |

FOREIGN PATENTS OR APPLICATIONS

| | | | |
|---|---|---|---|
| 564,291 | 10/1958 | Canada | 73/71.6 |
| 1,246,502 | 10/1960 | France | 73/71.6 |
| 759,817 | 11/1944 | Germany | 73/71.6 |
| 124,178 | 11/1958 | U.S.S.R. | 73/71.6 |

*Primary Examiner*—Nelson Moskowitz
*Attorney, Agent, or Firm*—Harold Levine; Rene E. Grossman; Leo N. Heiting

[57] ABSTRACT

A gyroscopic vibrator provides a new vibrational energy source for applications such as reflection seismology and shake tables. A gyroscopic mass is rotated at a high angular velocity about a shaft. A control force imparts an oscillatory angular displacement to the shaft, preferably in a plane perpendicular to the vector direction of the desired vibratory source. The resultant gyroscopic reactionary moment in the shaft includes a force component in the direction of the desired vibratory force. One end of the shaft is constrained by a reaction mass while the other end of the shaft is mechanically coupled to the mass which is to be excited. The resultant excitational forces are substantially greater than the controlled force required to impart the angular displacement to the shaft.

25 Claims, 4 Drawing Figures

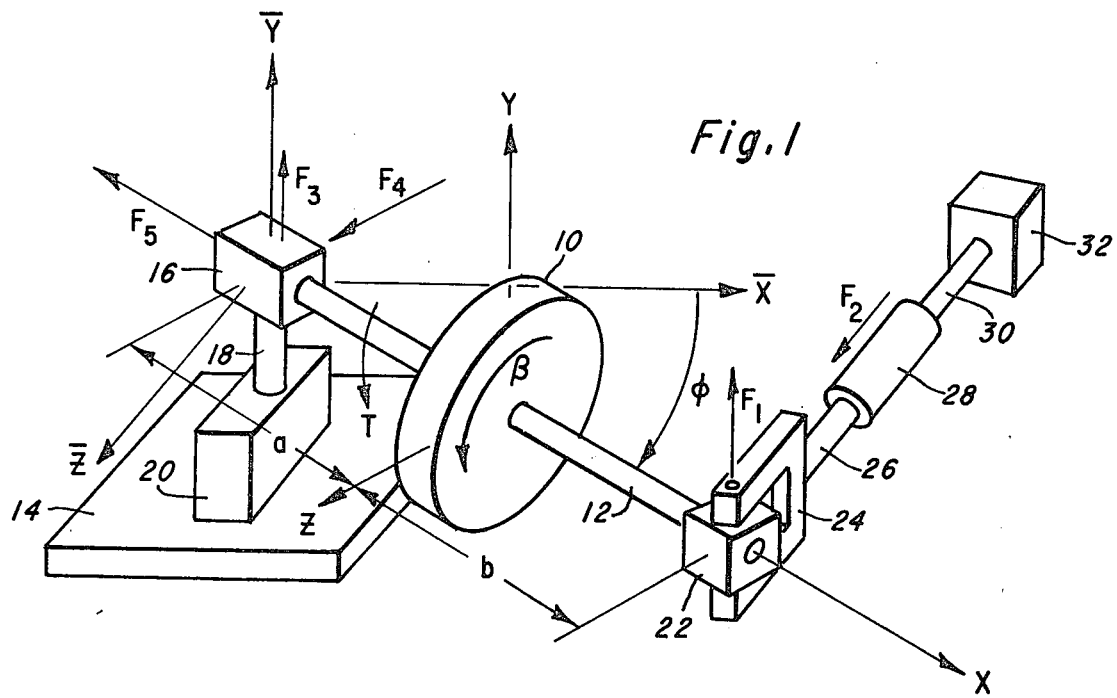
Fig. 1
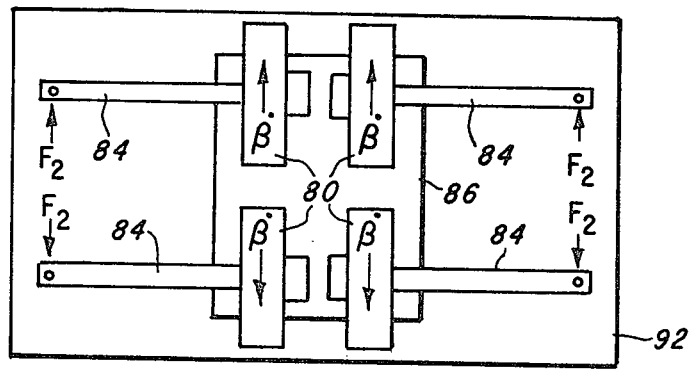
Fig. 3
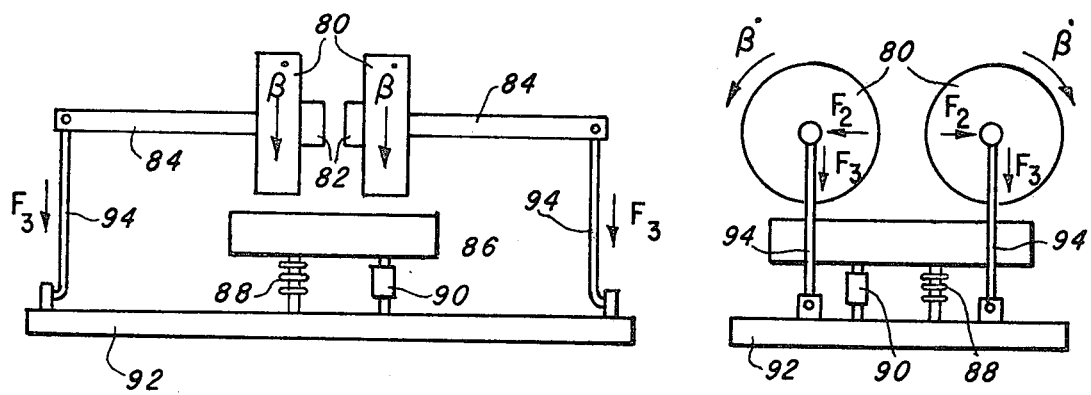

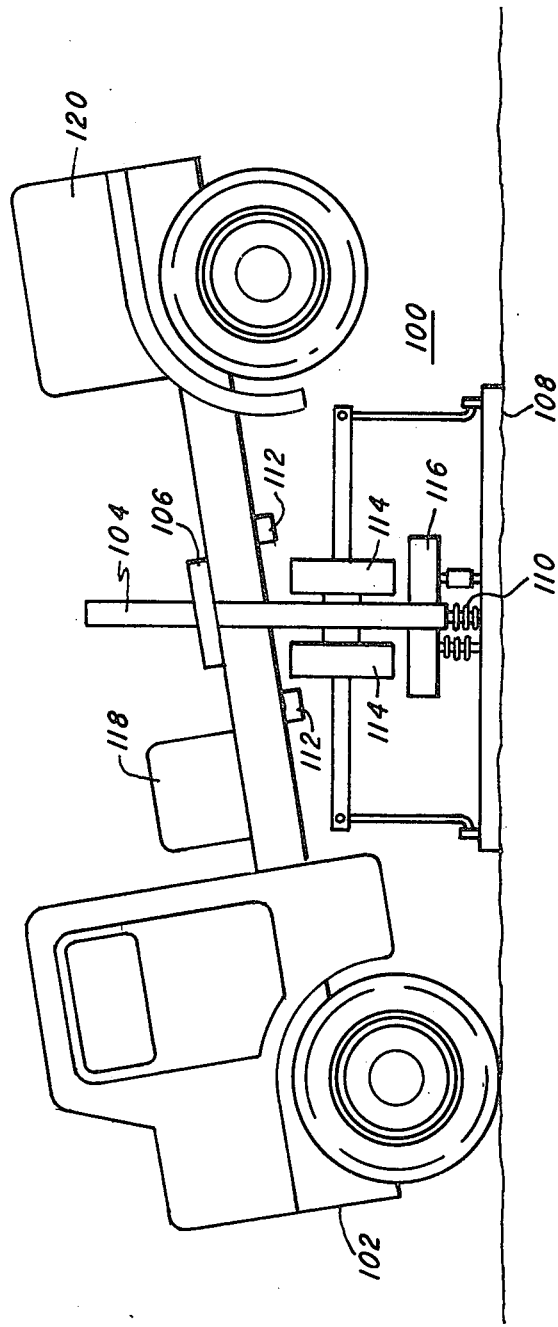

GYROSCOPIC VIBRATOR

This invention relates to the generation of vibratory forces and in particular to the use of gyroscopic reaction moments for the efficient generation of vibratory forces.

Controlled vibratory energy is required for many useful applications among which are shake tables for vibration testing, vibratory compactors and seismic energy generators for exploration purposes or earthquake simulation.

The present invention provides a novel means for producing controlled vibratory energy with particular emphasis on the seismic energy generation problem. Seismic exploration or prospecting is a technique used for mapping subsurface formations so as to provide useful information for locating underground petroleum deposits or other conditions of interest. Seismic prospecting is commonly carried out by generating a seismic signal or wave on or near the surface of the earth. This wave travels downward into the earth and a percentage of the downward traveling energy is reflected at discontinuities or interfaces between subsurface formations. The reflected energy is received at the surface and recorded for use as a means of mapping the subsurface formations.

The classical seismic energy source is high explosives. Because of high costs, ecological factors, hazards of operation and time consumed in their use, high explosives have been replaced to a large extent by other energy generators.

One of the most wiedely used seismic energy sources or signal generators is the shaker or vibrator. A significant advantage of the use of vibrators lies in the ability of such sources to impart large amounts of energy into the earth over a period of time. Techniques well known in the art are applied to the reflected and detected energy to effect time compression of the received signals, thereby resulting in a high signal-to-noise ratio. It is common practice to use vibratory sources to impart signals having an approximately sinusoidal waveform with a linearly increasing or decreasing frequency. A typical energy transmission of a seismic vibrator would be a frequency sweep extending from 5 to 80 hertz over a period of about ten seconds. A peak force amplitude of 15-30 thousand pounds is typically used.

One type of vibrator used in the past has involved counter rotating eccentric weights. Other vibrators have employed electrodynamic and hydrulic force generators. Eccentric weight vibrators have not been successful because they cannot achieve the desired force level over the required frequency range without changes in rotating weight or changes in eccentricity. Practical means to achieve these changes have not been developed.

Electrodynamic or electromagnetic vibrators have not been widely used because they cannot economically develop the large forces and displacements necessary in seismic wave generators.

Hydraulic vibrators are widely used as seismic wave generators. A typical system of this type is the Vibroseis* vibrator. Hydraulic vibrators have the disadvantage of requiring large power inputs and large hydraulic components with high flow capabilities. These requirements impose high system cost and make it difficult to produce seismic waves with a small amount of distortion. It is particularly difficult to generate large forces at low frequencies because of the large hydraulic flow required. The hydraulic seismic vibrator becomes more efficient with increasing frequency in the frequency range commonly used.

*TM of Continental Oil Company

The present invention overcomes some of the difficulties of prior art vibrators. Through the use of a high inertia rotor it is possible to achieve a large output force with a relatively small input or control force. This is particularly true at the lower frequencies utilized in seismic exploration. Thus, system control components can be reduced in size and improved responses are obtainable.

More specifically, a high inertial rotor is caused to rotate at a high angular velocity. In the preferred embodiment the axis of rotation of the rotor is oriented in a horizontal plane. Control forces are applied to the rotor shaft resulting in angular displacement of the shaft. Preferably, this angular displacement will have a harmonic time dependence with a linearly increasing or decreasing frequency and will lie in the horizontal plane. The resultant gyroscopic reaction moment in the shaft includes force components at the ends of the shaft acting along vertical axes. One end of the shaft is mechanically coupled to a large reaction mass thereby substantially preventing translation of this end of the shaft along a vertical axes. The other end of the shaft is free to translate along a vertical axes. This freely translating end of the shaft is mechanically coupled to a ground plate which in turn contacts the underlying earth material. The translations of the free end of the shaft are thereby transmitted through the ground plate to the underlying earth material.

In the frequency range of interest for vibratory seismic sources the force magnitudes required to impart the angular displacements to the shaft are significantly less than the resultant forces imparted to the earth. This fact permits the use of relatively low cost control components and results in improved seismic waveforms.

In another aspect of the invention a plurality of high angular velocity, high inertia rotors are used in a single vibratory source. These rotors are arranged in pairs such that the forces required to impart the angular displacement to the shafts of a pair of rotors act along the same force axis but in opposite directions. This has the desired effect of minimizing or entirely eliminating rotational forces acting on the ground plate. The resultant force acting on the underlying earth material is purely compressional and oriented along a vertical axis.

It is, therefore, an object of the invention to provide an improved vibratory source.

It is another object of the invention to provide an improved vibratory source for use in exploration seismology.

It is a further object of the invention to provide a system for the generation of vibratory forces which are greater in magnitude than are the control forces employed in the generation.

It is yet another object of the invention to provide a system for generating large vibratory signals having waveforms improved over those realizable with prior art devices.

It is still a further object of the invention to provide for the generation of vibratory forces through the use of the gyroscopic reaction moment induced when the rotational axis of a rotating gyroscopic mass is forced to undergo an angular displacement.

Other objects, features and advantages of the invention may be understood by consideration of the following detailed description in company with the attached drawings wherein:

FIG. 1 is a simplified model of the invention.

FIG. 3 illustrates the preferred configuration of the invention.

FIG. 4 shows the vibrator unit mounted on a vehicle.

Figure 2:
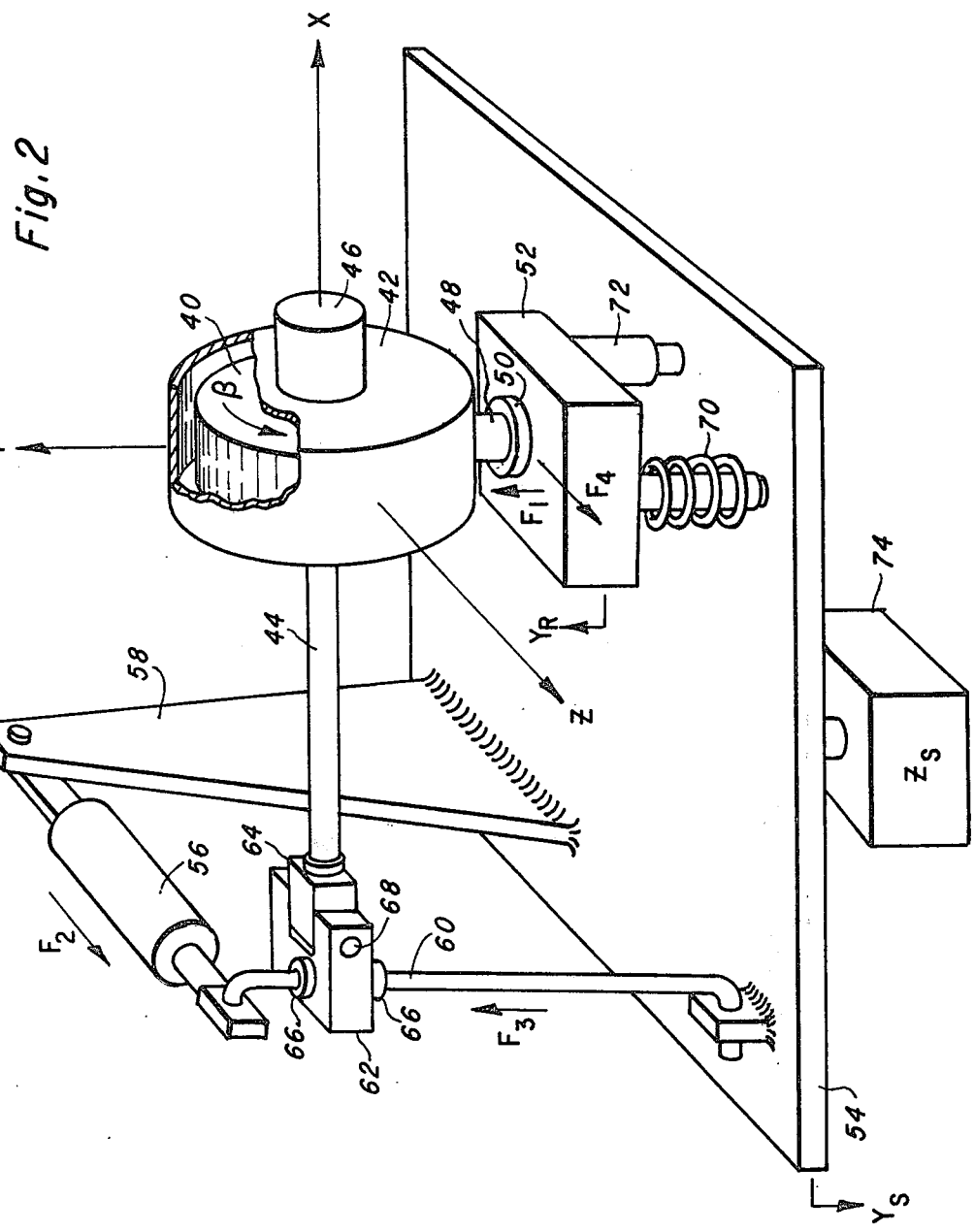
FIG. 2 shows a comprehensive model of the gyroscopic vibrator.

For clarity in explaining the invention, a simplified model is shown in FIG. 1. The system consists of a rotor 10 spinning with angular velocity $\dot{\beta}$ and mounted on shaft 12. A coupling plate 14 is located on the body to be vibrated. One end of shaft 12 is coupled to a block 16 and a stub shaft 18 which pivots in a member 20 attached to coupling plate 14. The other end of shaft 12 is attached to block 22. Block 22 is pinned in yoke 24 which is attached by means of shaft 26 to actuator 28. The end of actuator 28, opposite shaft 12, is attached by means of shaft 30 to fixed block 32. The acutator is programmed to move back and forth the end of shaft 12 at block 22, i.e. to pivot shaft 12 about stub shaft 18 so that the angle $\phi$ is a harmonic function of time with respect to the $\overline{X}, \overline{Y}, \overline{Z}$ coordinate system fixed in space. For small values of the angle $\phi$, the requirement that it vary harmonically with time is sufficiently met if actuator 28 causes yoke 24 to reciprocate in a harmonic fashion. Such reciprocating motion may be imparted by actuators of various types including elecrodynamic, electromagnetic and hydraulic sources. Actuator 28 may, for example, comprise a scaled down version of a hydraulic seismic source, such as that disclosed in U.S. Patent Application Ser. No. 355,838 filed Apr. 30, 1973 entitled "Improved Servo Hydraulic Transducer and Method of Operation".

The operational features of the invention may be most readily exemplified by assuming that the angular displacement of shaft 12 is constrained to occur in the $\overline{X}, \overline{Z}$ plane. In this case, actuator 28 is required to impose an alternating force $F_2$ on one end of shaft 12. This force, $F_2$ acting on shaft 12 results in angular displacement of shaft 12 and of spinning rotor 10 both in the $\overline{X}, \overline{Z}$ plane. As a result of the inertia of the spinning rotor, this angular displacement produces an alternating gyroscopic couple represented by forces $F_1$ and $F_3$ and occurring in the X, Y plane. Force $F_3$ is the desired harmonic force to provide vibratory energy and is coupled by block 16, stub shaft 18 and member 20 to plate 14. Force $F_1$ is a reaction force which should be restrained by a reaction mass or other structural load. Force $F_4$ is a reaction in the plane of the actuating force and must also be restrained by the structure.

Shaft 12 and rotor 10 may spin together or the rotor may spin independently on the shaft, the same result being obtained in either case. The effective length of shaft 12 is $a+b$ as shown in FIG. 1. T is the torque required to spin the rotor and $F_5$ is the axial force restraining the shaft and rotor.

The equations of motion for the system may be solved to determine the magnitudes of the forces involved. These equations include the Euler equations of rigid body dynamic and equations representing Newton's second law for rectilinear acceleration of the rotor. The X, Y, Z coordinate system is used for the rotor. The Euler equations are:

$$M_X = \dot{\omega}_X I_X - \omega_Y \omega_Z (I_Y - I_Z) \qquad (1)$$

$$M_Y = \dot{\omega}_Y I_Y - \omega_X \omega_Z (I_Z - I_X) \qquad (2)$$

$$M_Z = \dot{\omega}_Z I_Z - \omega_X \omega_Y (I_X - I_Y) \qquad (3)$$

where $M_X$, $M_Y$, and $M_Z$ are external moments; $\omega_X$, $\omega_Y$, and $\omega_Z$ are angular velocities of the rotor; and $I_X$, $I_Y$, and $I_Z$ are moments of inertia of the rotor, all taken about the X, Y, and Z axes, respectively. The angular velocities in this case are $$\omega_X = \dot{\beta} \qquad (4)$$

$$\omega_Y = -\dot{\phi} \qquad (5)$$

$$\omega_Z = 0 \qquad (6)$$

The Euler equations thus become $$T = I_X \ddot{} \qquad (7)$$

$$aF_4 - bF_2 = -I_Y \ddot{\phi} \qquad (8)$$

$$bF_1 - aF_3 = (I_X - I_Y) \dot{\beta} \dot{\phi} \qquad (9)$$

Since the rotor angular velocity $\dot{\beta}$ is constant, its angular acceleration $\ddot{\beta}$ is zero and equation (7) gives the trivial result $T = 0$ for the frictionless case.

Vertical and horizontal equations for the rotor are $$F_1 + F_3 = 0 \qquad (10)$$

$$F_2 + F_4 = M a \ddot{\phi} \qquad (11)$$

where M is the mass of the rotor, the shaft being assumed massless. The equation in the axial direction (for $F_5$) is unimportant and is not included here. In equation (10) the static weight of the rotor is omitted.

Equations (8) – (11) are four equations to solve for the four forces $F_1$, $F_2$, $F_3$, and $F_4$. $\dot{\beta}$ is given and $\phi$ is a given harmonic function of time.

$$\phi = A \sin \omega t. \qquad (12)$$

For a symmetrical rotor with $I_X = I$ and $I_Y = I_Z = I/2$

Solution yields $$F_1 = \frac{\dot{\beta} \omega I A \cos \omega t}{2(a+b)} \qquad (13)$$

$$F_2 = \frac{-\omega^2 \left(\frac{I}{2} + M a^2\right) A \sin \omega t}{(a+b)} \qquad (14)$$

$$F_3 = \frac{-\dot{\beta} \omega I A \cos \omega t}{2(a+b)} \qquad (15)$$

$$F_4 = \frac{\omega^2 \left(\frac{I}{2} - M ab\right) A \sin \omega t}{(a+b)} \qquad (16)$$

An ideal flywheel (a thin circular ring having its entire mass evenly distributed about the circle at radius $r$) has a moment of inertia $I = Mr^2$ where $r$ is the radius of the wheel.

Equation (14) shows that for the system of FIG. 1 the minimum actuating force is achieved with $a = 0$ because the actuating force then only pivots the rotor and does not translate it.

An advantage of the invention may be appreciated by considering as a numerical example an ideal flywheel with a radius $r = 6$ in., a weight of 1200 lb., and rotating at 13,000 rpm. There will be a stress in the flywheel of approximately 49,000 psi. The actuation amplitude is taken as $A = 5.7°$ and lengths $a$ and $b$ are 0 and 24 in., respectively. At an actuating frequency of 5Hz these parameters result in a vibratory force peak amplitude applied to the pad of $F_3 = 10,000$ lb. and a required actuating force amplitude peak of $F_2 = 230$ lb.

Consideration of equation 15 shows that in order to maintain a constant peak vibratory force as the actuating frequency increases it will be necessary to decrease the actuation amplitude as $1/\omega$. As seen in equation 14 the required actuating force then goes up as $\omega$. In the above example at 50 hertz if A is reduced to $0.57°$ then the vibratory force peak amplitude continues to have the value of 10,000 lbs. but the required actuating force peak amplitude increases to 2,300 lbs.

From the foregoing it will be seen that there is a force gain defined as vibratory force peak amplitude/actuating force peak amplitude. This gain in the above example is 43.3 at 5 hertz and 4.33 at 50 hertz. The comparable gain in a hydraulic vibrator is 1. Practice of the present invention permits the controlled generation of large vibratory seismic force amplitudes with control elements which are substantially reduced in size and cost over those required by prior art systems. Another advantage illustrated by the above example lies in the fact that the gyroscopic vibrator is most efficient at low frequencies and can readily develop large forces at low frequencies. This is contrasted with the hydraulic vibrator which is least efficient at low frequencies and requires large input powers to achieve high force levels at low frequencies.

The efficiency of the gyroscopic vibrator is reduced from the ideal case analyzed above by friction, by the power required to rotate the rotor, and by the fact that the rotor shaft must tilt to some extent in the plane of the vibratory force couple. However, the efficiency in a practical gyroscopic vibrator will still be significantly higher than that of a hydraulic vibrator.

FIG. 2 illustrates one possible physical embodiment of the invention including all the degrees of freedom which can occur.

A rotor 40 is mounted in a housing 42 and is rotatable about shaft 44. Housing 42 may be partially evacuated so as to reduce friction losses due to air drag on the rotor. Housing 42 and shaft 44 do not rotate but rotor 40 spins on shaft 44. Motor 46 provides the driving force necessary to rotate rotor 40 at the desired angular velocity $\beta$. The entire rotor assembly is coupled to reaction mass 52 by a stub shaft 48. The rotor assembly is enabled to rotate with respect to reaction mass 52 about the Y axis by means of bushing 50. Similarly, the rotor assembly can pivot with respect to reaction mass 52 about the Z axis by means of a second bushing (not shown) located at the upper end of stub shaft 48. In addition to these rotational degrees of freedom the rotor assembly together with reaction mass 52 can also translate in the Y direction, this displacement being shown in FIG. 2 as $Y_R$. Similarly, translation of ground plate 54 is indicated in FIG. 2 by $Y_S$.

Actuator 56 applies an alternating force $F_2$ between bracket 58 and the upper end of link 60. This alternating force is further coupled by yoke 62 and block 64 to one end of shaft 44. Yoke 62 is permitted to rotate about the vertical axis of link 60 by means of bushings 66. Yoke 62, however, is not permitted to translate in the vertical direction relative to link 60. As shown in FIG. 2, block 64 is permitted to rotate with respect to yoke 62 by means of pin 68.

The alternating force $F_2$ results in translation of the end of shaft 44 that is attached to block 64. This in turn causes angular rotation of the rotor assembly in the X, Z plane. Accordingly, a gyroscopic force couple indicated by $F_1$ and $F_3$ is generated. One component of this force couple $F_3$ is applied by means of link 60 to ground plate 54. Link 60 is long in comparison to the actuator displacement so that link 60 remains substantially vertical. Translation of the other end of shaft 44 in response to gryoscopic coupld force component $F_1$ is restrained by the inertia of reaction mass 52 and of the mass of rotor 40 and its housing. Spring 70 and damper 72 form a suspension to support the static weight of the reaction mass and rotor assembly. The natural vibration frequency of this suspension system is preferably well below desired vibration frequencies. As a result, vibrations of ground plate 54 are substantially decoupled from the reaction mass and rotor assembly. Block 74 schematically represents the mechanical impedance $Z_s$ which the earth or other coupling medium presents to the ground plate 54. This mechanical impedance must be included in the analysis of the system.

Analysis of the complex equations of motion for the system of FIG. 2 gives results similar to those obtained above for the simplified model of FIG. 1. For a given peak amplitude of the resultant force $F_3$, however, the required peak actuating force $F_2$ is somewhat greater in the comprehensive model of FIG. 2 than in the idealized model of FIG. 1. This results primarily from the fact that in the system of FIG. 2, the rotor assembly and shaft 44 are permitted to pivot about the Z axis. This angular rotation of the rotor assembly about the Z axis feeds back part of the gyroscopic couple into the actuating mechanisim 56. Analysis of the equations of motion indicates that in the typical frequency band of operation for seismic vibrators, the system of FIG. 2 will provide force gains $(F_3/E_2)$ ranging from 4 to 15.

It will be noted that in FIG. 2 the actuating force is applied at one end of shaft 44 while the rotor assembly is located at the opposite extremity of shaft 44. This arrangement is advantageous in at least two respects. First, as a result of this configuration, the actuating force is applied exclusively to induce angular rotation of the rotor assembly about the Y axis. No component of the actuating force is used to induce translational motion of the rotor assembly. Secondly, in this configuration the rotor assembly adds to and becomes part of the effective reaction mass.

It will be apparent, however, that other linkage, pivot and slider arrangements can be configured to achieve similar results and that the rotor and its actuating mechanism can be located in different positions for specific purposes without departing from the spirit of the invention.

The three views of FIG. 3 (top, front, and side) illustrate the preferred embodiment of the invention. In the interest of clarity the preferred embodiment is shown in somewhat diagramatic form, it being intended that each of the rotor systems shown therein be substantially similar to the system shown in FIG. 2. In particular, each of the rotor systems in FIG. 3 will have the same degrees of freedom as does the rotor system of FIG. 2.

In the preferred embodiment the system includes four gyroscopic rotors indicated generally be reference designator 80. The rotors are driven by individual motors 82 although in some cases it may be desirable to drive more than one rotor from a single motor. Each gyroscopic rotor rotates about its own individual shaft 84 with a rotational velocity $\beta$ and in a direction indicated by the arrows in FIG. 3. Each of the gyroscopic rotors 80 are mechanically coupled to a reaction mass 86. Static suspension of the reaction mass 86 relative to ground plate 92 is provided by a spring 88 and a damper 90. While a single reaction mass is employed in the preferred embodiment, it may be desirable in some cases to utilize four reaction masses, one associated with each of the gryoscopic rotors.

Vibratory forces acting at the ends of shafts 84 opposite the rotors and indicated in FIG. 3 by $F_3$ are coupled by means of links 94 to ground plate 92.

Operationally, the actuating forces $F_2$ are applied in the horizontal plane to the ends of shafts 84 opposite the rotors. The relative phase of the actuating forces are indicated by the arrows in FIG. 3. It will be understood by those skilled in the art that the reactions to these actuating forces are mutually cancelling so that the resultant twisting torque acting on the ground plate is zero. Moreover, as a result of the directions of rotation of the gyroscopic rotors 80 and of the relative phasing of the actuating forces $F_2$ it will be seen that the resultant gyroscopic reaction moment forces $F_3$ applied to the ground plate 92 will all act in phase. As a result, the ground plate 92 is forced to translate along a vertical axes, the net twisting forces applied to the ground plate being very small or zero. While the preferred embodiment has been disclosed as having four rotors, it will be apparent that other numbers of rotors may be employed without departing from the spirit of the invention.

In FIG. 4 there is shown a gyroscopic vibrator 100 mounted on a vehicle such as a truck 102. The vibrator is coupled to the truck by a lifting means which includes columns 104 located on either side of the vibrator. The columns 104 are slidably located in brackets 106 attached to the truck, the columns being adapted to move along a generally vertical axes with respect to the truck. The columns are coupled to the vibrator base plate 108 by spring means 110, such that when the columns are in a lowered position with respect to the truck as shown in FIG. 4, at least a portion of the truck weight is applied as a static load to the base plate. The compliance of spring means 110 will generally be selected such that the resonant frequency of the truck motion in response to vibrations induced in columns 104 will be substantially outside the range of frequencies induced in ground plate 108. Lifting means (not shown) adapted to raise columns 104 and consequently vibrator 100 with respect to the truck chassis may comprise one or more hydraulic cylinders associated with each column 104. Each of the cylinders may be coupled at one end to the truck chassis and at the other end to column 104 such that upon actuation of the hydraulic cylinders the columns 104 are caused to move in a generally vertical direction with respect to the truck chassis.

Bumpers or lock devices 112 are provided to limit the travel of the rotor housings 114 and reaction mass 116 when the vibrator is in the raised position. It will be recognized by those skilled in the art that if vibrator 100 comprises the preferred embodiment as illustrated in FIG. 3 and is oriented with respect to the truck as shown in FIG. 4, that the gyroscopic reaction forces induced by turning and bouncing of the truck during movement will tend to be mutually cancelling.

A conventional electric and/or hydraulic power supply 118 and control system 120 are also located on the truck. As is known in the art these are adapted to provide suitable energization of the lifting means and of the actuating means in the gyroscopic vibrator.

There has been disclosed a new method and apparatus for producing controlled vibratory forces. Within the frequency range of interest in seismic applications for example, the amplitudes of the actuating forces required in the system are significantly less than the amplitudes of the resultant vibratory forces. As a result, the apparatus required to impart these actuating forces is simplified over that required by prior art vibrators and the waveforms of the resultant vibratory forces may be substantially improved, particularly at very low frequencies. While certain embodiments of the invention have been disclosed it will be appreciated that further modifications may now suggest themselves to those skilled in the art and it is intended to cover such modifications as fall within the scope of the appended claims.

What is claimed is:

1. An apparatus for initiating seismic waves in the earth by exerting forces on the earth along a predetermined axis, said apparatus comprising:
   a. a rotatable mass having means for causing said mass to spin about a rotational axis,
   b. means for applying a force which tends to impart an angular displacement to said rotational axis, at least a component of said angular displacement being in a plane perpendicular to said predetermined axis to produce a gyroscopic force couple, and
   c. means for coupling at least one force component of said gryoscopic couple to the earth.

2. The apparatus of claim 1 wherein said rotational axis is a horizontal axis.

3. The apparatus of claim 2 wherein said angular displacement is in a horizontal plane.

4. The apparatus of claim 3 wherein said angular displacement is an approximately harmonic function of time with an increasing or decreasing frequency.

5. A gryoscopic seismic energy source comprising:
   a. a mass rotatably mounted upon a horizontal shaft,
   b. means for rotating said mass about said horizontal shaft,
   c. means for causing angular displacement of said horizontal shaft and the rotating mass mounted thereon in a horizontal plane to produce a gyroscopic force couple in a vertical plane,
   d. reaction mass means for restricting vertical movement of one end of said horizontal shaft, and
   e. a ground plate coupled to the second end of said horizontal shaft and in contact with the earth for transmitting a force component of said gyroscopic force couple to the earth.

6. The energy source of claim 5 wherein said rotating mass is located within a partially evacuated enclosure.

7. The energy source of claim 6 wherein said horizontal shaft is arranged to pivot about a vertical axis located at one end thereof and said means for causing angular displacement comprises an actuator coupled to impart a reciprocating motion to the other end of said horizontal shaft.

8. The energy source of claim 7 wherein said reciprocating motion is approximately harmonic with an increasing or decreasing frequency.

9. A gyroscopic seismic vibrator comprising:
   a. a plurality of rotors each including means for inducing rotation thereof about a rotational aixs,
   b. means for imparting an angular displacement to the rotational axis of each of said rotors to produce a gyroscopic force couple in each of said rotors, and
   c. means for coupling at least one force component of each of said gyroscopic force couples to the earth.

10. A vibratory seismic energy source comprising:
    a. a plurality of gyroscopic rotors, each rotor having means for inducing rotation thereof about a horizontal shaft,
    b. means for substantially preventing horizontal translation of a first end of each of said horizontal shafts,
    c. reaction mass means operatively coupled to each said first end for reacting to vertical forces induced in the shaft end,
    d. a ground plate in contact with the earth and coupled to a second end of each said horizontal shaft for applying forces induced in each said second end to the earth, and
    e. actuating means for imparting a reciprocating motion in a horizontal plane to each said second end, said actuating means being arranged such that there is no substantial twisting torque or horizontal translational force applied to the ground plate.

11. The vibratory energy source of claim 10 wherein said plurality of gyroscopic rotors are grouped in pairs such that the spin vectors of the two rotors in any pair are opposed when in their quiescent orientations, and the force vectors applied to said second ends of the corresponding pair of said horizontal shafts by said actuating means are opposed.

12. The vibratory seismic energy source of claim 10 further comprising a vehicle for transporting the vibrator, said vehicle including lifting means for raising said vibrator with respect to the vehicle frame and for lowering said vibrator with respect to the vehicle frame such that at least a portion of the vehicle weight is applied as a static load to the vibrator ground plate when the vibrator is in the lowered position.

13. The vibratory seismic energy source of claim 12 wherein the relative locations and orientations of said gyroscopic rotors result in mutual cancellation of the gyroscopic reation forces resulting from turning of the truck during movement thereof.

14. A system for applying a vibrational force to an object comprising:
    a. a mass and means for rotating said mass about a shaft,
    b. means for applying an angular displacement to said shaft to produce gyroscopic forces therein,
    c. means for coupling at least a component of said gyroscopic couple forces to said object.

15. The system of claim 14 wherein said angular displacement varies harmonically with time.

16. The system of claim 14 wherein said angular displacement is approximately harmonic with varying frequency.

17. The system of claim 14 wherein said means for coupling is arranged to apply translational forces to said object.

18. The system of claim 14 wherein said means for coupling is arranged to apply a twisting couple to said object.

19. A method for imparting vibrational seismic force to the earth along a preselected force axis comprising:
    a. rotating a gyroscopic mass about a shaft,
    b. causing angular displacement of said shaft in a plane perpendicular to said preselected force axis to produce a gyroscopic force couple, and
    c. applying at least one force component of the said gyroscopic force couple to the earth.

20. The method of claim 19 wherein said angular displacement is in a horizontal plane.

21. The method of claim 19 wherein said angular displacement varies harmonically with time.

22. The method of claim 19 wherein said angular displacement is approximately harmonic with a time varying frequency.

23. A method for inducing energy in the earth comprising:
    a. rotating a gyroscopic mass about a shaft,
    b. constraining a first end of said shaft to prevent vertical movement thereof,
    c. applying a reciprocating force to a second end of said shaft to produce a gyroscopic couple therein, and
    d. coupling to the earth the vertical forces induced in the second end of said shaft by said gryoscopic couple.

24. A method of generating seismic energy in the earth comprising:
    a. rotating a plurality of gyroscopic masses, each about its own horizontal shaft,
    b. constraining a first end of each of said horizontal shafts so as to restrict vertical translation thereof,
    c. applying horizontal reciprocating forces to the second end of each of said horizontal shafts,
    d. placing a ground plate in contact with the earth, and
    e. coupling to said ground plate, the vertical forces induced in the second ends of each of said horizontal shafts by the resultant gyroscopic couples.

25. The method of claim 24 wherein the step of coupling is such as to prevent the application of rotational forces to said ground plate.

* * * * *